United States Patent
Nakayama

(10) Patent No.: US 9,954,270 B2
(45) Date of Patent: Apr. 24, 2018

(54) MOBILE TERMINAL TO PREVENT DEGRADATION OF ANTENNA CHARACTERISTICS

(71) Applicant: SONY CORPORATION, Tokyo (JP)

(72) Inventor: Takashi Nakayama, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/903,328

(22) PCT Filed: Jun. 12, 2014

(86) PCT No.: PCT/JP2014/003120
§ 371 (c)(1),
(2) Date: Jan. 7, 2016

(87) PCT Pub. No.: WO2015/033498
PCT Pub. Date: Mar. 12, 2015

(65) Prior Publication Data
US 2016/0380334 A1 Dec. 29, 2016

(30) Foreign Application Priority Data

Sep. 3, 2013 (JP) .................................. 2013-181765

(51) Int. Cl.
*H01Q 1/24* (2006.01)
*H04M 1/02* (2006.01)
(Continued)

(52) U.S. Cl.
CPC ........... *H01Q 1/243* (2013.01); *G06F 1/1626* (2013.01); *G06F 1/1698* (2013.01); *H01P 5/10* (2013.01);
(Continued)

(58) Field of Classification Search
CPC .......................................... H01Q 1/241–1/243
See application file for complete search history.

(56) References Cited

U.S. PATENT DOCUMENTS

| | | | | |
|---|---|---|---|---|
| 7,079,079 B2* | 7/2006 | Jo | .......................... | H01Q 1/243 343/700 MS |
| 7,911,387 B2* | 3/2011 | Hill | ........................ | H01Q 1/243 343/700 MS |

(Continued)

FOREIGN PATENT DOCUMENTS

| | | | |
|---|---|---|---|
| JP | 2004-153861 A | 5/2004 | |
| JP | 2009-094670 A | 4/2009 | |

(Continued)

OTHER PUBLICATIONS

Extended European Search Report of EP Patent Application No. 14842712.3, dated Mar. 27, 2017, 09 pages.

*Primary Examiner* — Dameon E Levi
*Assistant Examiner* — Hasan Islam
(74) *Attorney, Agent, or Firm* — Chip Law Group

(57) ABSTRACT

A mobile terminal includes: a plurality of antenna inputs; a selecting unit configured to select one of the plurality of antenna inputs; a metal chassis used for holding a panel for display and maintaining mechanical strength of the panel; and a PIFA type antenna having a resonance pattern and a coaxial cable in which a coating removed portion is provided in a part in a manner that an external conductor is exposed, the PIFA type antenna being configured to fix the coating removed portion in a vicinity of an upper end of the metal chassis.

5 Claims, 8 Drawing Sheets

(51) Int. Cl.
*H01Q 9/04* (2006.01)
*H01Q 1/50* (2006.01)
*G06F 1/16* (2006.01)
*H01P 5/10* (2006.01)

(52) U.S. Cl.
CPC ............. *H01Q 1/50* (2013.01); *H01Q 9/0407* (2013.01); *H01Q 9/0421* (2013.01); *H04M 1/026* (2013.01); *H04M 1/0266* (2013.01)

(56) References Cited

U.S. PATENT DOCUMENTS

| | | |
|---|---|---|
| 2006/0001582 A1 | 1/2006 | Hayashi |
| 2006/0001590 A1* | 1/2006 | Hung ................... H01Q 9/0407 343/846 |
| 2006/0119517 A1 | 6/2006 | Futamata |
| 2006/0208950 A1 | 9/2006 | Tago |
| 2008/0316116 A1 | 12/2008 | Hobson et al. |
| 2009/0295669 A1 | 12/2009 | Su et al. |
| 2010/0060612 A1 | 3/2010 | Jeon et al. |
| 2012/0009983 A1* | 1/2012 | Mow ....................... H01Q 1/243 455/575.7 |
| 2012/0162032 A1 | 6/2012 | Yang et al. |
| 2012/0206302 A1 | 8/2012 | Ramachandran et al. |

FOREIGN PATENT DOCUMENTS

| | | |
|---|---|---|
| JP | 2012-019526 A | 1/2012 |
| JP | 2013-048470 A | 3/2013 |
| JP | 2013-070365 A | 4/2013 |
| WO | 2012/070242 A | 5/2012 |

* cited by examiner

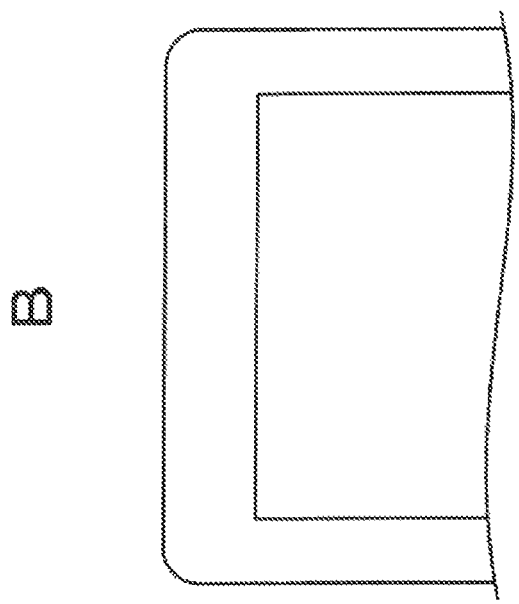
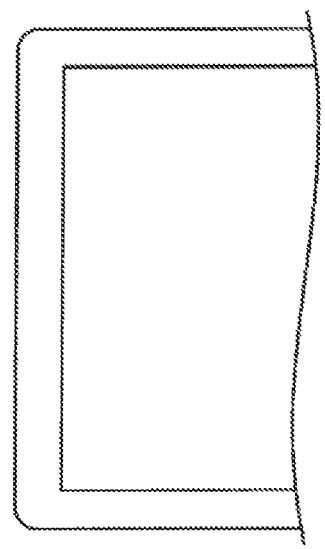
FIG. 11

MOBILE TERMINAL TO PREVENT DEGRADATION OF ANTENNA CHARACTERISTICS

TECHNICAL FIELD

The present disclosure relates to a tablet type mobile terminal to be applied to, for example, a terminal designed for electronic books.

BACKGROUND ART

In recent years, in addition to a laptop personal computer, a number of types of tablet type mobile electronic terminal equipment typified by a smartphone which has evolved from a mobile phone have been commercialized. Such tablet type mobile electronic terminals include one which uses an optical touch panel.

In the optical touch panel, a group of light emitting diodes (LEDs) for infrared light and a group of photodiodes for receiving infrared light from the group of LEDs for infrared light are disposed so as to encompass a panel for display. Scanning lines generated by infrared light are extensively laid on the panel. By blocking these infrared scanning lines using a finger, a stylus pen, or the like, which position on the panel for display is touched is specified.

However, tablet type mobile electronic terminals of recent years are dominated by terminals of a type in which an antenna for a wireless local area network (LAN), or the like, is incorporated into a chassis and a function for performing radio communication is provided. Therefore, in the case of a tablet type mobile electronic terminal employing the above-described optical touch panel method, a structure is employed in which an antenna portion for performing radio communication is provided outside the group of LEDs for infrared light and the group of photodiodes for receiving the infrared light mounted on a main substrate.

As an antenna, for example, a planar inverted F antenna (hereinafter, referred to as a PIFA type antenna) is used. For example, as disclosed in Patent Literature 1, a planar radiation element of the PIFA type antenna is provided in parallel with a panel face.

CITATION LIST

Patent Literature

Patent Literature 1: JP 2013-048470A

SUMMARY OF INVENTION

Technical Problem

However, the above-described method which has been used in the past has the following problems.

In recent years, in accordance with dramatic spread of tablet type mobile electronic equipment, senses of value and life styles of users, has become diverse, and more stylish design is preferred. Particularly, in mobile electronic equipment for reading books, such as a terminal designed for electronic books, users prefer a shape of a narrow bezel (narrow frame) as design on a display face side to read books with the same sense as that of books. Further, a narrow bezel is desirable for making the terminal smaller.

In the case of the tablet type mobile electronic terminal employing the optical touch panel method as in the related art, because the planar radiation element of the PIFA type antenna for performing radio communication is provided outside the group of LEDs for infrared light and the group of photodiodes mounted on the main substrate in parallel with the panel face, a width of the bezel becomes wider. Therefore, it is difficult to realize a design shape of a narrow bezel (narrow frame), and it is difficult to satisfy user preference of users of terminals designed for electronic books which are specialized for a reading function.

Therefore, an object of the present disclosure is to provide a small mobile terminal having a shape of a narrow bezel (narrow frame).

Solution to Problem

According to the present disclosure, there is provided a mobile terminal including: a metal chassis used for holding a panel for display and maintaining mechanical strength of the panel; and a PIFA type antenna having a resonance pattern and a coaxial cable in which a coating removed portion is provided in a part in a manner that an external conductor is exposed, the PIFA type antenna being configured to fix the coating removed portion in a vicinity of an upper end of the metal chassis.

Advantageous Effects of Invention

According to the present disclosure, it is possible to realize design of a narrow bezel (narrow frame) on a body display face side in a mobile terminal, so that it is possible to make the mobile terminal smaller and satisfy user preference for design. Further, it is possible to prevent degradation of antenna characteristic due to current mismatch. It should be noted that advantageous effects of the present disclosure are not limited to advantageous effects described here and may be any advantageous effects described in the present disclosure.

BRIEF DESCRIPTION OF DRAWINGS

FIG. 11 is a schematic diagram used for explaining advantageous effects of the present disclosure.

DESCRIPTION OF EMBODIMENTS

An Embodiment described below is a preferred specific example of the present disclosure, and various limitations which are technically desirable are applied. However, the scope of the present disclosure is not limited to this embodiment in the following description unless it is particularly described that the present disclosure is limited.

Description will be provided in the following order.
<1. One Embodiment>
<2. Modified Example>

1. One Embodiment

"Appearance of Terminal Designed for Electronic Books"

Figure 1:
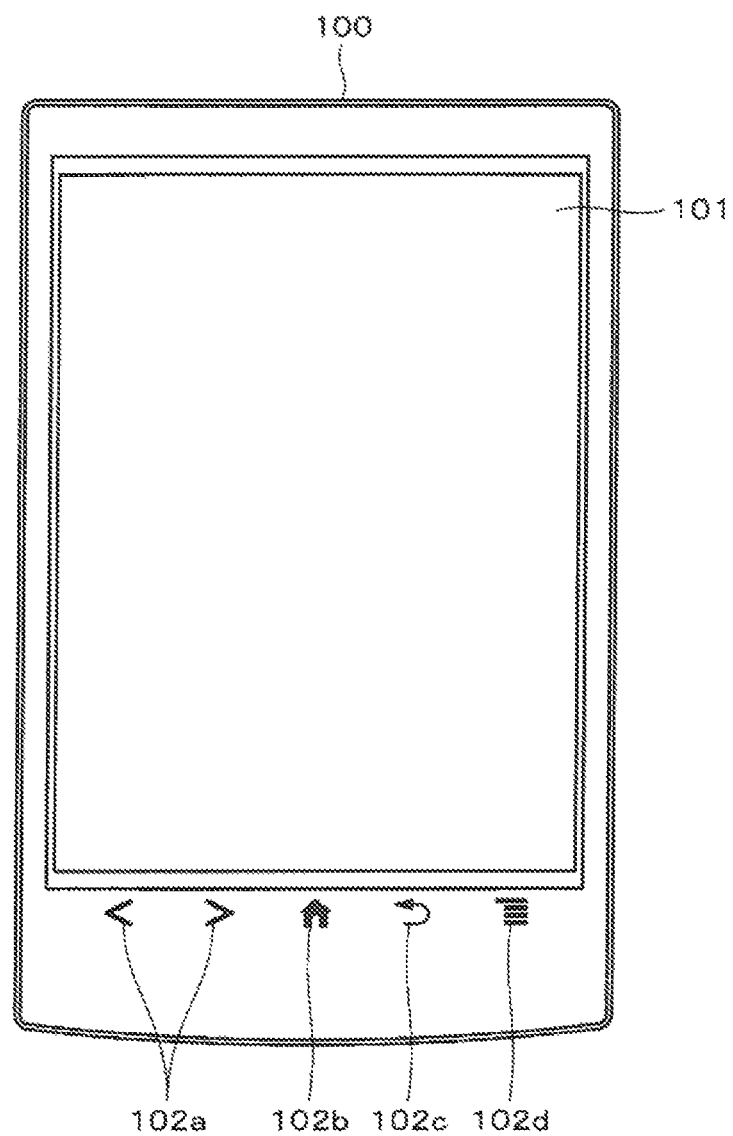
FIG. 1 is a front view illustrating appearance according to one embodiment of the present disclosure.

One embodiment of the present disclosure is an embodiment in which the present disclosure is applied to a terminal designed for electronic books. As illustrated in FIG. 1, a terminal designed for electronic books 100 has a touch panel 101. The touch panel 101 employs an optical touch panel method. The touch panel 101 is provided on a display. As the display, for example, six-inch electronic paper can be used. The electronic paper has an advantage that a user can easily view characters as if the user viewed characters on paper, and is preferably used for the terminal designed for electronic books.

A bezel encompasses the touch panel 101. Further, the terminal designed for electronic books 100 has a shape of a tablet terminal having a back face, a side face, an upper end face and a lower end face when a display face of the touch panel 101 is faced up.

At a lower side of the touch panel 101, an operation button is disposed. The operation button includes a page turning button 102a, a home button 302b, a back button 102c and a menu button 102d. When the page turning button 102a is depressed, the page returns to the previous page or goes to the nest page. When fee home button 102b is depressed, house menu is displayed. When the back button 102c is depressed, the screen returns to the previous screen. When the menu button 102d is depressed, menu which can be used in each application is displayed.

On the side face of the terminal designed for electronic books 100, a memory card slot is provided. On the lower end face of the terminal designed for electronic books 100, a reset button, a micro universal serial bus (USB) terminal, a power button and a battery access lamp are provided.

The reset button is depressed with a fine pin, or the like, when reset operation is performed. After reset, by the power button being depressed, the terminal is restarted. The USB terminal is used for connecting with a computer. When the power button is depressed, the terminal designed for electronic books is powered on. It is possible to put the terminal into a sleep mode to suppress power consumption. The battery access lamp is lighted red while a secondary battery inside the body is charged, and blinks orange upon startup or shutdown. The secondary battery can be charged by the computer by utilizing the USB terminal or can be charged by an AC adapter.

A method for purchasing electronic books includes a method in which a computer is used and a method in which a radio communication function of the terminal designed for electronic books 100 is utilized. Dedicated software is installed at the computer, a store is accessed through the Internet, and a book is downloaded to the computer from the store. Then, the book is transferred to the terminal designed for electronic books from the computer. As the radio communication function, for example, a function of WiFi (registered trademark) (IEEE 802.11) of 2.4 GHz is utilized to purchase a book from the store, and the book is downloaded to the terminal designed for electronic books. The terminal designed for electronic books has, for example, an internal memory of 2 GB, and can hold book data in the internal memory.

The book which is downloaded and stored in the internal memory can be read using the terminal designed for electronic books. A bookmark and memo can be attached to the book. It should be noted that WiFi (registered trademark) is one example of the radio communication function, and it is also possible to use other communication methods, for example, Bluetooth (registered trademark) of 2.4 GHz.

"Mechanical Configuration"

Figure 2:
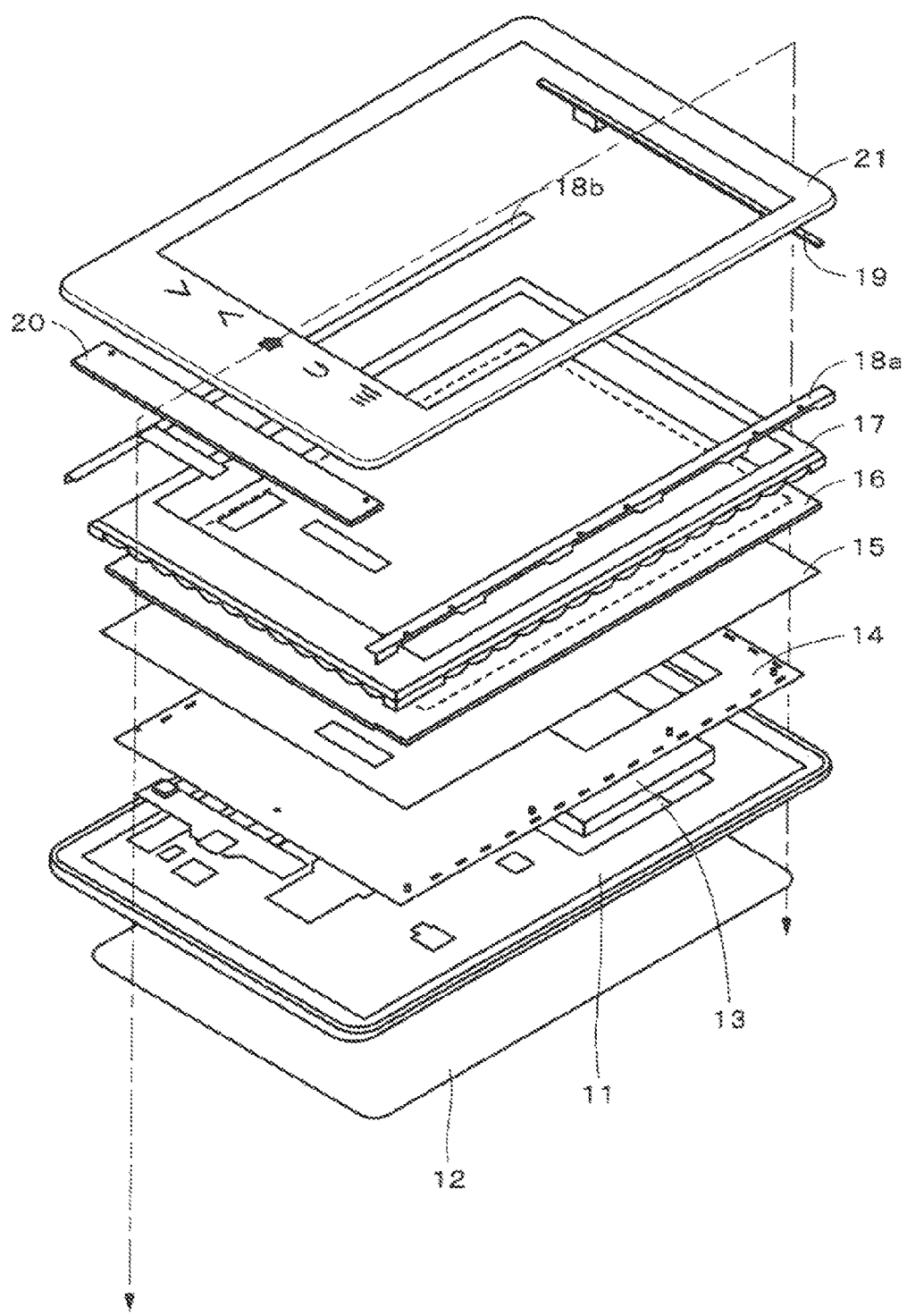
FIG. 2 is an exploded perspective view illustrating a mechanical configuration according to one embodiment of the present disclosure.
Figure 3:
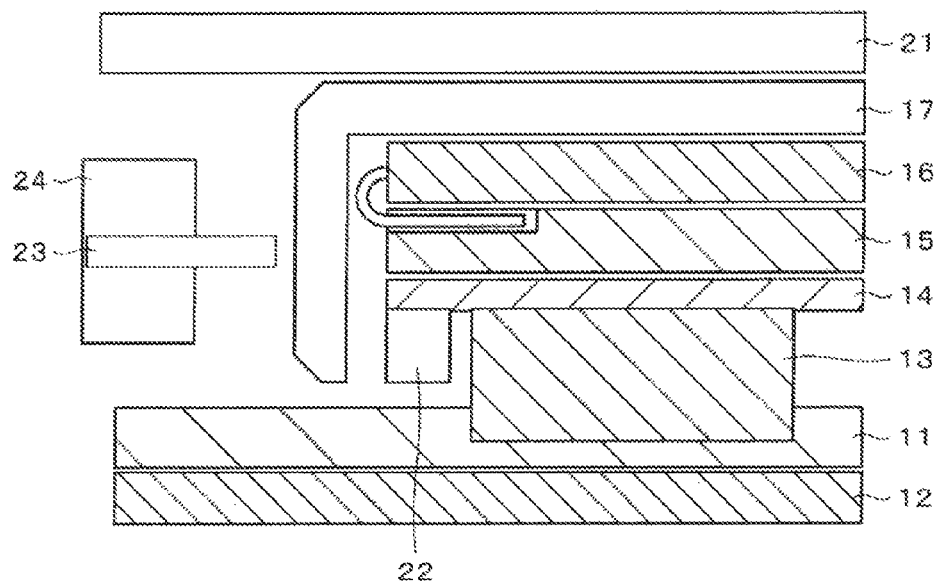
FIG. 3 is an enlarged cross-section diagram illustrating the mechanical configuration according to one embodiment of the present disclosure.

As illustrated in FIG. 2, the terminal designed for electronic books has a structure in which a plurality of components are laminated. FIG. 3 is a cross-section diagram cut along a line indicated with a dashed-dotted line in FIG. 2. A rear case 11 which is a synthetic resin mold has a concave portion for storing parts. A rear cover 12 made from a synthetic resin is laminated on a lower face of the rear case 11. While the reset button, the micro USB terminal, the power button, or the like, are provided on a lower end face, of the rear case 11 as described above, these are omitted in the illustration in FIG. 2.

A reference numeral 13 designates a battery for example a lithium-ion secondary battery. A main substrate 14 is stored within the rear case 11. The main substrate 14 is a printed circuit board. On the main substrate 14, a group of LEDs for infrared light and a group of photodiodes for receiving the infrared light are mounted around the window. Further other circuit components are mounted on the main substrate 14.

On the main substrate 14, a metal chassis 15, electronic paper 16 and a light guide plate 17 are laminated in this order. The main substrate 14, the metal chassis 15, the electronic paper 16 and the light guide plate 17 configure an optical touch panel. The metal chassis 15 is used to protect the main substrate 14 and maintain mechanical strength of the terminal designed for electronic books, and, as the metal chassis 15, for example, an alloy AZ91D is used. As the electronic paper 16, for example, an electrophoretic display (EPD) is used.

Front brackets 18a and 18b are disposed at both sides of right and left sides of the light guide plate 17. The front brackets 18a and 18b are made from a metal, for example, stainless, and are provided to reinforce the side face. On the front brackets 18a and 18b, a top frame 19 and a bottom frame made from a synthetic resin are disposed. A frame-shaped front case 21 made from a synthetic resin is provided at an uppermost part. The component parts described above are sequentially laminated, and a laminated state is fixed using a method such as an adhesive, a double-sided tape and a screw. For example, the main substrate 14 and the metal chassis 15 are jointly fastened using a metal screw. Therefore, the metal chassis 15 can be regarded as a housing ground integrated with a substrate ground.

FIG. 3 illustrates a cross-section of the mechanical structure. An LED 22 as a light source is provided on the main substrate 14, and light from the LED 22 is guided on an upper face of the electronic paper 16 through the light guide plate 17.

Figure 4:
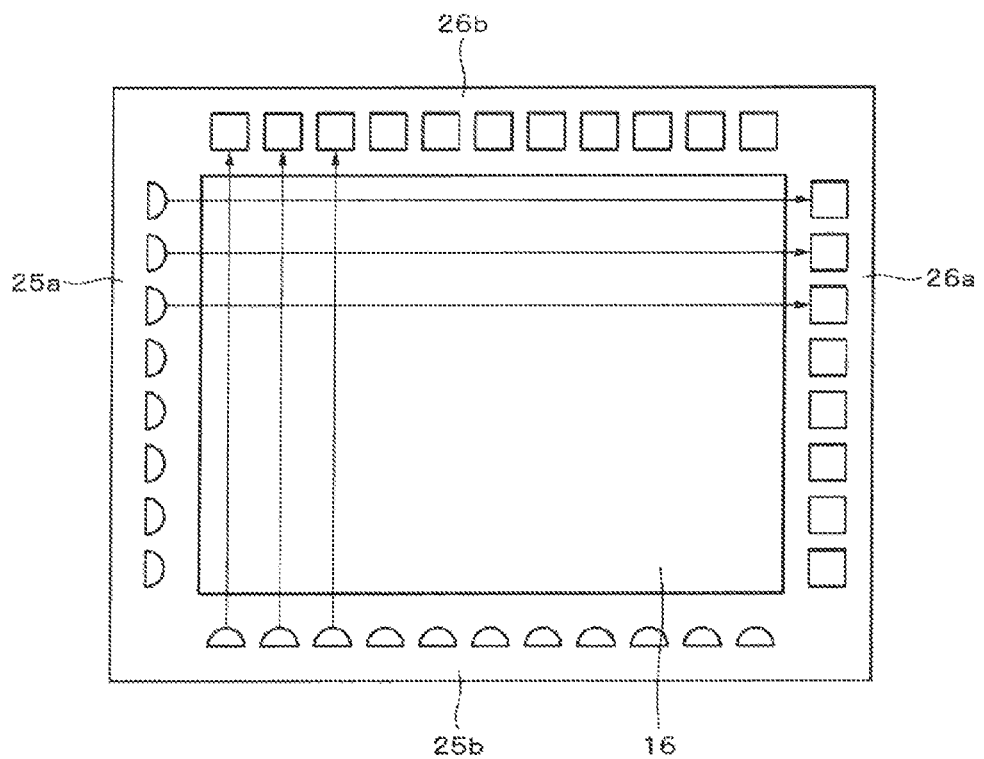
FIG. 4 is a schematic diagram used for explaining an optical touch panel.

As schematically illustrated in FIG. 4, on the optical touch panel, groups of LEDs for infrared light 25a and 25b and groups of photodiodes (or phototransistors) 26a and 26b are disposed around the display (electronic paper 16). The groups of LEDs for infrared light 25a and 25b and the groups of photodiodes (or phototransistors) 26a and 26b are mounted on the main substrate 14. The LEDs for infrared light correspond to the photodiodes (or phototransistors) on a one-to-one basis, and scanning lines by the infrared light are extensively laid on the display. Therefore, by blocking the scanning, lines with a finger, a stylus pen, or the like, a position of the finger, the stylus pen, or the like, is detected.

"Attachment of Antenna"

One embodiment of the present disclosure has a function of WiFi (registered trademark) (IEEE 802.11). As an internal antenna to implement this function, a PIFA type antenna is used. The antenna is provided outside a region of the optical touch panel 101 in a region close to an upper end of the terminal designed for electronic books 100. The antenna is disposed such a position because when a distance between a hand of a person and the antenna is small, a radio wave is absorbed by a human body, which causes a problem such as decrease of gain. It is typical that the terminal designed for electronic books is used while a lower half of the body is grasped with one hand or both hands. Therefore, it is preferable not to provide an antenna in a central region and a lower region of the body.

Further, in one embodiment of the present disclosure, a radiation element of the PIFA type antenna is attached substantially vertically with respect to a bottom face of the rear case 11. The radiation element of the PIFA type antenna has a resonance pattern generated on a flexible substrate or a normal wiring substrate. Further, a portion of a frequency resonance pattern corresponding as a radio function of the radiation element of the PIFA type antenna, is not limited to the flexible substrate or the normal wiring substrate, and may be formed with a metal such as a sheet metal and copper foil.

Figure 5:
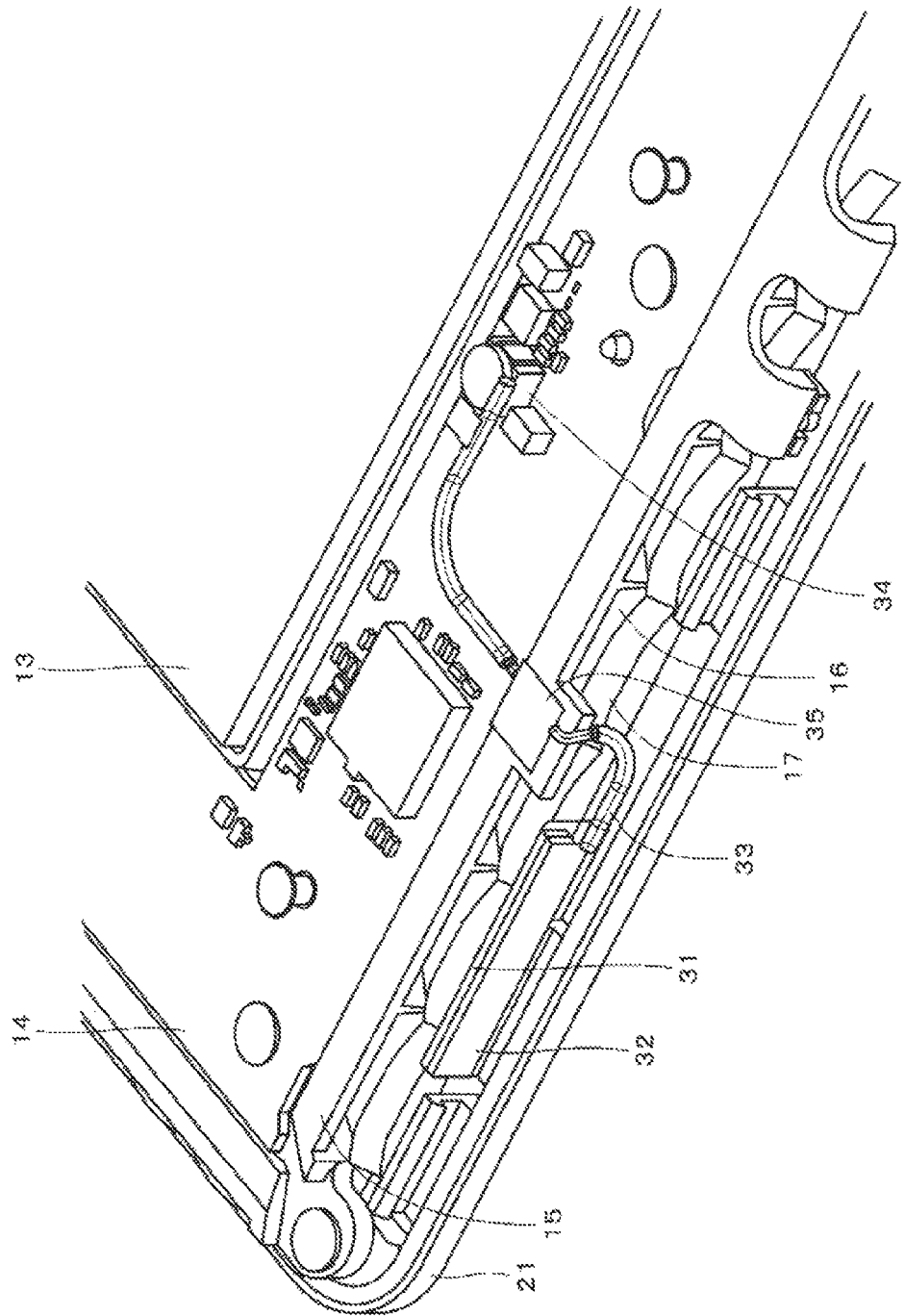
FIG. 5 is a partial perspective view used for explaining an antenna attachment configuration according to one embodiment of the present disclosure.

As illustrated in an enlarged view of FIG. 5, a plate-like rib 31 is vertically raised from the front case 21. The radiation element 32 of the PIFA type antenna is pasted to a plate face of the plate-like rib 31. The plate-like rib 31 is molded integrally with the front case 21, and the plate face of the plate-like rib 31 is formed to have substantially the same shape as a shape of the radiation element 32. The plate-like rib 31 is formed to have a longitudinal direction substantially in parallel with an upper end face of the front case 21 in the vicinity of the upper end face of the front case 21.

FIG. 5 illustrates an example of a front side viewed from a rear side, and the radiation element 32 is provided while being biased to a right side in a viewing direction. While an installation position in a horizontal direction is not limited to the example illustrated in FIG. 5 and can be arbitrary set, the installation position is selected so as to minimize a distance between the radiation element 32 and an RF connecting unit 34 of the main substrate 14. A terminal of the radiation element 32 is connected to the RF connecting unit 34 through a coaxial cable 33. Further, two or more PIFA type antennas may be provided to perform diversity reception.

Figure 6:
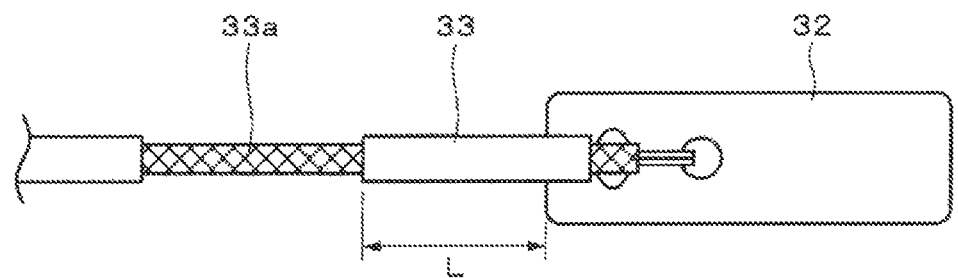
FIG. 6 is a schematic diagram illustrating an antenna and a coaxial cable connected to the antenna.

The coaxial cable 33 is configured such that an internal conductor of a copper wire is covered with an insulator (dielectric body), the insulator is covered with an external conductor (mesh netting copper wire), and protective coating is provided at an outermost circumference. As illustrated in FIG. 6, in the coaxial cable 33, coating of a predetermined portion is peeled, so that a coating removed portion 33a where the external conductor is exposed is formed.

Figure 7:
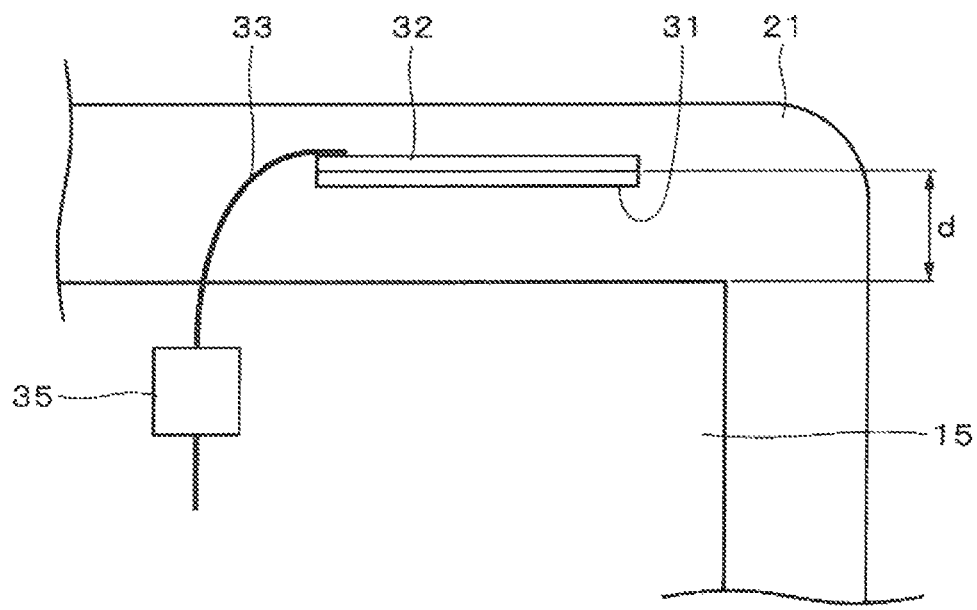
FIG. 7 is a schematic diagram used for explaining a position where the antenna is attached.

As illustrated in FIG. 5 and FIG. 7, the coating removed portion 33a where the external conductor is exposed is fixed to the metal chassis 15. The above-described external conductor at the coating removed portion 33a of the coaxial cable 33 is reliably fixed to a connection portion formed on the metal classes 15, using, for example, a conductive tape 35. Therefore, the external conductor at the coating removed portion 33a is electrically connected to a housing ground. A length of the coating removed portion 33a is set at 5 mm or longer so as to be stably fixed to the metal chassis 15.

Further as illustrated in FIG. 7, a distance d between the radiation element 32 and an upper end of the metal chassis 15 is secured in such a level that antenna characteristics are not affected by the metal chassis 15. For example, the distance d is set at 3 mm or greater at a minimum.

Influence of a leak current from the external conductor of the coaxial cable will be described with reference to FIG. 8. As one example, a case of a half wavelength dipole antenna will be described. A dipole antenna is an antenna in which tip opening transmission lines are respectively opened at 90 degrees in opposite directions from each other centering around a power supply so that the tip opening transmission lines form one straight line. Two conductive wires (referred to as elements) 41a and 41b are connected to positive and negative electrodes of the power supply. An antenna whose full length is made half the wavelength is referred to as a half wavelength dipole antenna.

In the half wavelength dipole antenna, a current IR in a direction a current flows out from the power supply is generated at an element 41a, and a current IR in a direction a current flows into the power supply is generated at an element 41b. When the half wavelength dipole antenna is fed via the coaxial cable, the current of the element 41a flows through the internal conductor 42, while the current of the element 41b flows through the external conductor 43.

Typically, an antenna is a balanced element in principle, while a coaxial cable is an unbalanced conductive wire. When the antenna which is a balanced element is fed with the coaxial cable which is an unbalanced conductive wire, it is necessary to minimize a leak current to the external conductor to improve antenna characteristics.

Figure 8:
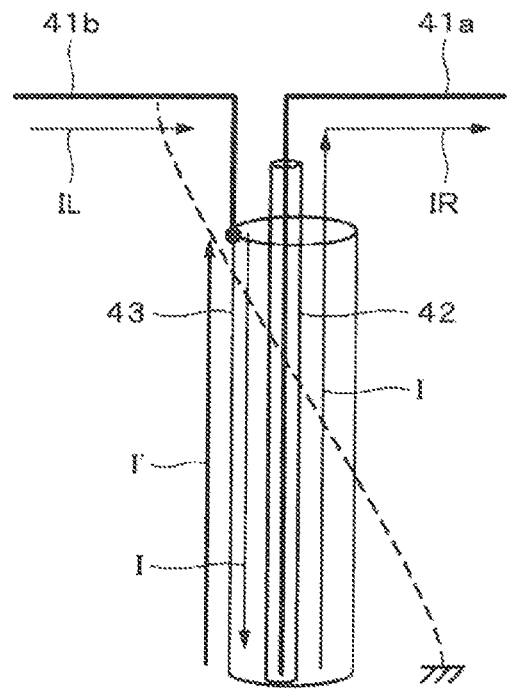
FIG. 8 is a schematic diagram for explaining influence of a leak current from an external conductor of the coaxial cable.

As illustrated in FIG. 8, when a signal current I is fed to a feeding point of the antenna using the coaxial cable, the current IR flows to an element at the right side of the half wavelength dipole antenna, while a current IL flows as a return current from an element at the left side. Because the antenna is a balanced element, it is ideal that IR=TL. However, as described above, because the coaxial cable is an unbalanced conductive wire, a leak current I' is generated at the external conductor. Therefore, (IR=I, IL=I–I'). In this manner, disturbance of current distribution occurs between the two elements 41a and 41b of the half wavelength dipole antenna due to mismatch of flowing currents, which makes it difficult to perform ideal antenna operation.

Because the above-described phenomenon occurs due to the balanced element being connected to the unbalanced element, in order to minimize a leak current to the external conductor 43, a measure of inserting Spertopf Balun which is a balanced-unbalanced conversion element between the balanced element and the unbalanced element is frequently taken.

Figure 9:
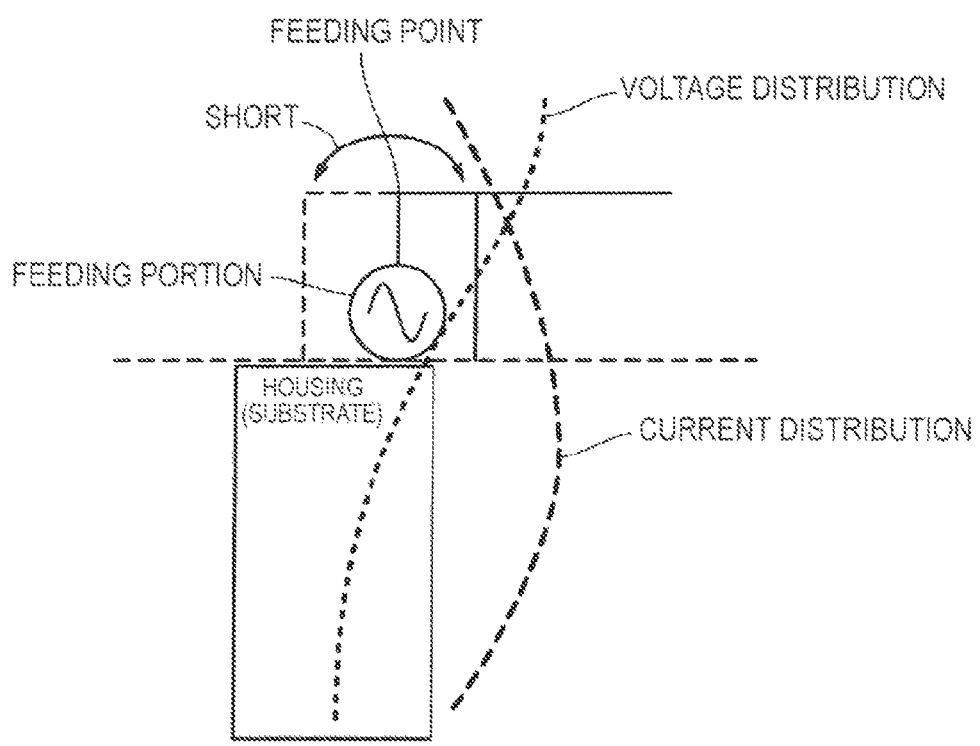
FIG. 9 is a schematic diagram used for explaining principle of a PIFA type antenna.

In one embodiment of the present disclosure, the PIFA type antenna is used as the antenna. Operation principle of the PIFA type antenna is illustrated in FIG. 9. The PIFA type antenna can be considered as a modified type of ¼ wavelength monopole antenna. Therefore, a substrate ground of a radio circuit or a chassis ground grounded at the substrate ground is regarded as an ideal ground, and the chassis ground side is made to operate as an element of ¼ wavelength of an image side. Specifically, a short-circuit point is provided near the feeding point, and by changing a distance, adjustment is performed so that input impedance matching of the antenna itself is easily achieved.

In one embodiment of the present disclosure, as illustrated in FIG. 5, the metal chassis 15 which is jointly fastened using a metal screw with the substrate ground of the main substrate on which the radio circuit is mounted operates equivalently to the above-described chassis ground. That is, the coating removed portion 33a of the peeled coaxial cable 33 is grounded to the chassis ground, so that Spertopf Balun is equivalently configured. Therefore, current mismatch due to balanced-unbalanced is reduced, and improvement of the antenna characteristics is realized.

Figure 10:
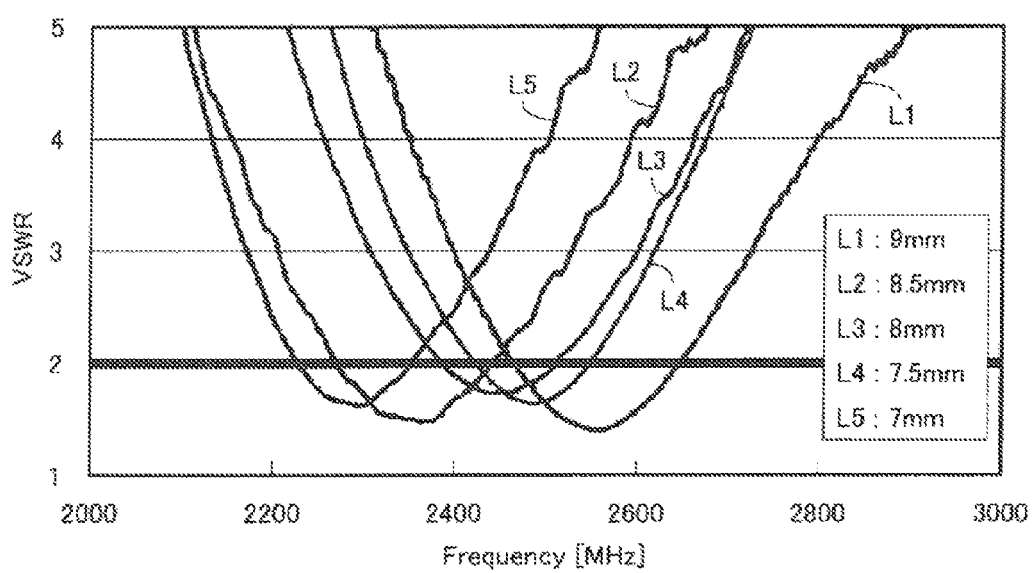
FIG. 10 is a graph used for explaining adjustment of input impedance according to a position of a coating removed portion.

Further, it is possible to adjust input impedance of equivalent Spertopf Balun according to a position of the coating removed portion 33a. As illustrated in FIG. 6, by fixing a length of the coating removed portion 33a and changing a distance L between an end of the radiation element 32 and a start position of the coating removed portion 33a, characteristics of the PIFA type antenna change as illustrated in FIG. 10.

As one example, frequency characteristics of a voltage standing wave ratio (VSWR) of each of live types of distances (L1=9 mm), (L2=8.5 mm), (L3=8 mm), (L4=7.5 mm) and (L5=7 mm) are measured. The VSWR is preferably as low value as possible. For example, it is preferable that VSWR=1.5 or less. In a frequency band to be used, the distance L is set so as to minimize the VSWR.

According to one embodiment of the present disclosure, it is possible to provide the following advantages.

1. Because in an upper part of the body, the PIFA type antenna is disposed so as to be substantially vertical to the panel for display, it is possible to realize design of a narrow bezel (narrow frame) at a side of the body display face in the tablet type mobile electronic terminal, so that it is possible to satisfy user preference for design. FIG. 11A illustrates appearance of an upper part of a terminal apparatus according to the present disclosure, for example, a terminal designed for electronic books, and FIG. 11B illustrates appearance of an upper part of an existing terminal designed for electronic books. The terminal designed for electronic books according to the present disclosure can realize a narrower width of the bezel compared to that of the existing terminal designed for electronic books.

In the related art, a coaxial cable is extracted from an RF connector of a radio circuit mounted on a main substrate, and an antenna portion is disposed horizontally with respect to a panel for display on a chassis case which is located further outside a metal chassis protecting the main substrate. With this method, it is difficult to configure a narrow bezel. There is another method for attaching an antenna, in which an antenna portion is disposed horizontally with respect to a panel for display outside scanning lines by infrared light of a group of LEDs for infrared light and a group of photodiodes mounted for an optical touch panel so as not to obstruct the scanning lines. With this method, an area of the antenna portion becomes larger, which makes it difficult to configure a narrow bezel. Because, in the present disclosure, an antenna portion is disposed on a face vertical to a face where the panel for display is disposed on an upper part of the body, it is possible to make an area of the antenna smaller, and configure a narrow bezel.

2. The coating removed portion 33a where the external conductor is exposed by coating of the coaxial cable connected to the PIFA type antenna being peeled is pasted to the metal chassis 15 using the conductive tape 35 and is grounded to the chassis ground. With this configuration, because Spertopf Balun is formed between the coaxial cable and the antenna as an electrically equivalent circuit, it is possible to prevent degradation of the antenna characteristics due to current mismatch.

3. Because the antenna is disposed on an upper part of the body, particularly, in a terminal designed for electronic books which is mainly used for reading in a category of the tablet type mobile electronic terminal, it is possible to make the terminal rarely influenced by a hand of a human body when the terminal is normally used. Accordingly it is possible to realize a chassis structure which is very advantageous as radio characteristics.

2. Modified Example

While fee embodiment of the present disclosure has been specifically described above, the present disclosure is not limited to the above-described embodiment, and various modifications can be made based on technical scope of the present disclosure. For example, the configurations, the methods, the process, the shapes, the materials, the numerical values, or the like, described in the above-described embodiment are merely examples, and configurations, methods, process, shapes, materials, numerical, values, or the like, different from those described above may be used as necessary. For example, the present disclosure can be also applied to a case where an antenna is used when a communication link other than WiFi (registered trademark) is used.

Additionally, the present technology may also be configured as below.

(1)

A mobile terminal including a metal chassis used for holding a panel for display and maintaining mechanical strength of the panel, and a PIFA type antenna having a resonance pattern and a coaxial cable its which a coating removed portion is provided in part so that an external conductor is exposed, the PIFA antenna being configured to fix the coating removed portion in the vicinity of an upper end of the metal chassis.

(2)

The mobile terminal according to (1), in which in a region in the vicinity of an upper end of a body, a portion of the resonance pattern is disposed vertically with respect to a face of the panel for display.

(3)

The mobile terminal according to (2), in which the upper end of the metal chassis is separated from the resonance pattern by a predetermined distance.

(4)

The mobile terminal according to any one of (1) and (2), in which the panel configures an optical touch panel, and the PIFA type antenna is disposed outside the optical touch panel.

(5)

The mobile terminal according to any one of (1), (2) and (4), in which the resonance pattern is formed on a flexible substrate or on a wiring substrate.

(6)

The mobile terminal according to any one of (1), (2) and (4), in which the resonance pattern is generated by a metal.

(7)

The mobile terminal according to any one of (1), (2) and (4), in which when the coating removed portion is fixed in the vicinity of the upper end of the metal chassis, input impedance of the PIFA type antenna is adjusted according to a position of the coating removed portion.

REFERENCE SIGNS LIST

11 rear case
14 main substrate
15 metal chassis
16 electronic paper
17 light guide plate
21 front case
31 plate-like rib
32 radiation element
33 coaxial cable
33*a* coating removed portion
35 conductive tape

The invention claimed is:
1. A mobile terminal, comprising:
a panel configured to display a menu;
a metal chassis configured to hold the panel; and
a planar inverted F antenna (PIFA) antenna, comprising:
a resonance pattern that extends away from a face of the panel; and
a coaxial cable comprising an external conductor, wherein coating of a portion of the external conductor is removed such that a coating removed portion of the external conductor is exposed,
wherein the PIFA antenna is configured to fix the resonance pattern in a vicinity of an upper end of the metal chassis, and
wherein an input impedance of the PIFA antenna is adjusted based on a length of the coating removed portion and a change in a first distance between an end terminal of the resonance pattern and a start position of the coating removed portion.

2. The mobile terminal according to claim 1, wherein the upper end of the metal chassis is separated from the resonance pattern by a second distance.

3. The mobile terminal according to claim 1, wherein the panel comprises an optical touch panel, and the PIFA antenna is present outside the optical touch panel.

4. The mobile terminal according to claim 1, wherein the resonance pattern is on a flexible substrate or on a wiring substrate.

5. The mobile terminal according to claim 1, wherein the resonance pattern comprises a metal.

* * * * *